United States Patent
Labat (10) Patent No.: US 12,461,175 B2
(45) Date of Patent: Nov. 4, 2025

(54) LOW-NOISE RF DETECTION AND ACQUISITION SYSTEM BASED ON SQUID AND EQUIPMENT ITEMS INCLUDING THIS SYSTEM

(71) Applicant: Chipiron, Paris (FR)

(72) Inventor: Dimitri Labat, Paris (FR)

(73) Assignee: Chipiron, Paris (FR)

( * ) Notice: Subject to any disclaimer, the term of this patent is extended or adjusted under 35 U.S.C. 154(b) by 212 days.

(21) Appl. No.: 18/255,967

(22) PCT Filed: Dec. 2, 2021

(86) PCT No.: PCT/FR2021/052187
§ 371 (c)(1),
(2) Date: Jun. 5, 2023

(87) PCT Pub. No.: WO2022/117969
PCT Pub. Date: Jun. 9, 2022

(65) Prior Publication Data
US 2024/0045005 A1     Feb. 8, 2024

(30) Foreign Application Priority Data

Dec. 3, 2020   (FR) ...................................... 2012642

(51) Int. Cl.
*G01R 33/32*      (2006.01)
*A61B 5/05*       (2021.01)
(Continued)

(52) U.S. Cl.
CPC .............. *G01R 33/326* (2013.01); *A61B 5/05* (2013.01); *A61B 5/245* (2021.01); *G01R 33/34* (2013.01);
(Continued)

(58) Field of Classification Search
CPC .. G01R 33/326; G01R 33/00; G01R 33/0035; G01R 33/0023; G01R 33/34;
(Continued)

(56) References Cited

U.S. PATENT DOCUMENTS

| 7,394,250 B2 | 7/2008 | Itozaki et al. |
| 2004/0027125 A1 | 2/2004 | Clarke et al. |

(Continued)

FOREIGN PATENT DOCUMENTS

| CN | 1287160 A | 3/2001 |
| CN | 1643403 A | 7/2005 |

(Continued)

OTHER PUBLICATIONS

Japanese Notice of Reasons for Refusal for Application No. 2023-557831 dated May 7, 2024, 4 pages.

(Continued)

*Primary Examiner* — Lee E Rodak
*Assistant Examiner* — Taqi Nasir
(74) *Attorney, Agent, or Firm* — TraskBritt (57) ABSTRACT

A radiofrequency detection and acquisition system, which is based on SQUID and configured to be integrated into a nuclear magnetic resonance system, comprises a primary detection antenna, a flux transformer having an inlet winding connected to the primary detection antenna, a low critical temperature SQUID device for capturing the magnetic flux produced by an outlet winding of the flux transformer and supplying a secondary detection signal, a cryogenic device for cooling the SQUID device and the flux transformer, and means for processing the secondary detection signal emitted by the SQUID device to supply an analogue acquisition signal. The primary detection antenna may be of the volume type, comprising Helmholtz coils or saddle coils, or a more complex volume geometry, particu- (Continued)

larly gradiometric geometry. The means for processing the secondary detection signal may comprise a flux-locked loop, provided to linearize the response of the SQUID device.

16 Claims, 2 Drawing Sheets

(51) Int. Cl.
    *A61B 5/245*     (2021.01)
    *G01R 33/34*     (2006.01)
    *G01V 3/12*     (2006.01)

(52) U.S. Cl.
    CPC ......... *G01R 33/34061* (2013.01); *G01V 3/12* (2013.01)

(58) Field of Classification Search
    CPC ..... G01R 33/34061; A61B 5/245; A61B 5/05; G01V 3/12
    See application file for complete search history.

(56) References Cited

U.S. PATENT DOCUMENTS

| | | | | |
|---|---|---|---|---|
| 2006/0091881 | A1* | 5/2006 | Clarke | G01R 33/326 324/301 |
| 2006/0113998 | A1* | 6/2006 | Itozaki | F41H 11/134 340/552 |
| 2010/0264921 | A1 | 10/2010 | Horng et al. | |
| 2012/0206136 | A1 | 8/2012 | Kim et al. | |
| 2013/0271142 | A1* | 10/2013 | Penanen | A61B 5/704 324/320 |

FOREIGN PATENT DOCUMENTS

| | | |
|---|---|---|
| CN | 105137374 A | 12/2015 |
| JP | 2007-029401 A | 2/2007 |
| JP | 2010-525892 A | 7/2010 |
| JP | 2010-256318 A | 11/2010 |
| JP | 2013-181848 A | 9/2013 |
| WO | 2003/067267 A2 | 8/2003 |
| WO | 2006/052236 A1 | 5/2006 |
| WO | 2008/091712 A2 | 7/2008 |

OTHER PUBLICATIONS

Chukharkin et al., Improvement of Ultra-Low Field Magnetic Resonance Recordings With a Multilayer Flux-Transformer-Based High-TC SQUID Magnetometer, IEEE Transactions on Applied Superconductivity, vol. 23, No. 3, (Jun. 2013), 4 pages.
Japanese Notice of Reasons for Application No. 2023-557831 dated Feb. 13, 2025, 3 pages.
Chen, Hsin-Hsien et al., A Compact SQUID-Detected Magnetic Resonance Imaging System Under Microtesla Field in a Magnetically Unshielded Environment,, Journal of Applied Physics, American Institute of Physics, vol. 110, No. 9, Nov. 1, 2011 (Nov. 1, 2011).
Clarke, Dr. John, The SQUID Handbook: Fundamentals and Technology of SQUIDs and SQUID Systems, May 26, 2004 Wiley-VCH 2004 edition.
Demachi et al., T1-Weighted Image by Ultra-Low Field SQUID-MRI, IEEE Transactions on Applied Superconductivity, vol. 29. Issue 5, (Aug. 2019).
Fagaly, R. L., Superconducting Quantum Interference Device Instruments and Applications, Review of scientific instruments 77, 101101 , Oct. 11, 2006.
Hirota et al., Magnetic Detection of a Surface Ship by an Airborne LTS SQUID MAD, IEEE Transactions on Applied Super conductivity, vol. 11, Issue 1, (Mar. 2001), pp. 884-887.
Ilmoniemi et al., University of Aalto in Finland, https://www.aalto.fi/en/department-of-neuroscience-and-biomedical-engineering/meg-mri-brain-imaging-group, Mar. 17, 2020, 5 pages.
International Search Report for International Application No. PCT/FR2021/052187 dated Apr. 7, 2022, 3 pages.
International Written Opinion for International Application No. PCT/FR2021/052187 dated Apr. 7, 2022, 9 pages.
Vesanen et al., Hybrid Ultra-Low-Field MRI and Magnetoencephalography System Based on a Commercial Whole-Head Neuromagnetometer, Magn Reson Med., vol. 69, No. 6, (Jun. 2013).
Lee et al., SQUID-Detected MRI at 132 MicroT with T1-Weighted Contrast Established at 10 MicroT—300mT, Magn Reson Med, vol. 53, No. 1, (Jan. 2005), pp. 9-14.
Chinese First Office Action, including Search Report for Chinese Application No. 202180081713.3., dated Jul. 21, 2025, 16 pages with translation.
Japanese Decision of Refusal for Japanese Application No. 2023-557831, dated Jul. 22, 2025, 6 pages with English translation.
Korean Office Action for Application No. 10-2023-7022106 dated Jun. 29, 2025, 15 pages with English translation.

\* cited by examiner

LOW-NOISE RF DETECTION AND ACQUISITION SYSTEM BASED ON SQUID AND EQUIPMENT ITEMS INCLUDING THIS SYSTEM

CROSS-REFERENCE TO RELATED APPLICATIONS

This application is a national phase entry under 35 U.S.C. § 371 of International Patent Application PCT/FR2021/052187, filed Dec. 2, 2021, designating the United States of America and published as International Patent Publication WO 2022/117969 A1 on Jun. 9, 2022, which claims the benefit under Article 8 of the Patent Cooperation Treaty of French Patent Application Serial No. FR2012642, filed Dec. 3, 2020.

TECHNICAL FIELD

The present disclosure relates to a low-noise RF detection and acquisition system based on SQUID. It also relates to equipment items including this system, in particular, magnetic resonance imaging equipment.

BACKGROUND

It is well known to use detection systems based on SQUID (for "Superconducting QUantum Interference Device") in magnetic resonance imaging (MRI) equipment.

During an MRI experiment, the subject is placed in a stationary and homogeneous magnetic field $B_0$. The sample is then subjected to an RF frequency signal $\omega$ tuned to the Larmor frequency $\omega_0 = \gamma B_0$ of protons in the field $B_0$, where $\gamma/(2\pi) = 42.6$ MHz.T$^{-1}$ the gyromagnetic ratio of the proton. Following this excitation, the sample emits a frequency signal $\omega_0$ picked up by a detection system, the principle of which in modern commercial equipment is based on a cooled inductive antenna.

The usual MRI paradigm is to choose the highest possible magnetic field, for two reasons:
  The first is that a higher field makes it possible to bias a larger number of protons, which leads to more signal, therefore a reduced experiment time and finer image resolution.
  The second is that conventional RF detection is done with an inductive antenna, the sensitivity of which is proportional to $\omega$.

By taking into account the thermal noise level in $\omega^{1/4}$, the only detection of the Faraday antenna follows a law $\omega^{-3/4}$. Since $\omega$ is proportional to the working field $B_0$, working at high field makes it possible to lower the detectivity threshold. Typical clinical MRI equipment works at 1.5 T or 3 T. Certain models go up to 7 T, and experiments are aiming to reach 11.7 T.

However, increasing the field produces ion noise in the sample, degrades image quality due to differences in the magnetic susceptibility of tissues, and tends to level the contrasts, to say nothing of the usual constraints related to high fields: costly superconducting coils to be produced and maintained, magnetically shielded MRI coils, no MRI for people with cardiac stimulators or pacemakers, nor for bullet-wounded soldiers.

Document CN105137374A discloses an MRI apparatus with nanometric-resolution SQUID detection, implementing a magnetic resonance imaging method and an ultra-high resolution device. This method comprises at least one step of placing a tested sample in the working range of a magnetic field gradient source and a nano superconducting quantum interference device, a step of using a static magnetic field source to apply a static magnetic field to the tested sample, and using a radiofrequency source to apply a nuclear magnetic resonance radiofrequency pulse to the tested sample to excite the tested sample in order to generate nuclear magnetic resonance, a step of using the nano superconducting quantum interference device to directly couple the tested sample to detect the nuclear magnetic resonance spectrum signal generated by the tested sample, and a step of establishing the image of the tested sample as a function of the detected nuclear magnetic resonance spectrum signal and of the spatial distribution information of the magnetic field gradient source. The nano superconducting quantum interference device is used as a detector, magnetic resonance imaging with a nanometric level resolution may be carried out, the measurement is not disrupted by vibrations and an electric field signal, the sample can be directly coupled with the detector at a close distance, the image range is increased, and work in a strong magnetic field is carried out.

Document JP2010256318A discloses high-resolution proton nuclear magnetic resonance equipment and imaging (NMR/MRI) using a superconducting quantum interference device (SQUID) at high critical temperature (high Tc) via a magnetic flux transformer in a micro Tesla magnetic field. The invention relates to a method and an apparatus. The SQUID and the input coil are installed in a superconducting tank that protects ambient noise and puts the SQUID into a stable operating state. The NMR signal can be maintained even when the sample is remote from the SQUID detector.

Document CN1287160C discloses an NMR and MRI device with SQUID detection, with prepolarization, wherein the nuclear magnetic resonance (NMR) signals are detected in microtesla fields. Prepolarization in millitesla fields is followed by detection with an untuned direct-current superconducting quantum interference device magnetometer (SQUID).

Document WO2006052236A1 discloses an NMR and MRI device with SQUID detection, with prepolarization and Faraday primary antenna. Magnetic resonance imaging in a very low magnetic field is based on very low field NMR. Gradient magnetic fields are applied, and images are constructed from the detected NMR signals.

These SQUID-based detection and acquisition devices have the drawback of requiring pre-polarization methods and employ high-Tc SQUIDS.

Document Chen Hsin-Hsien et al: "*A compact SQUID-detected magnetic resonance imaging system under microtesla field in a magnetically unshielded environment*," Journal of Applied Physics, American Institute of Physics, vol. 110, no. 9, 1 November 2011 (2011-11-01), discloses a system for radiofrequency detection and acquisition based on SQUID, provided, in particular, to be integrated in a nuclear magnetic resonance apparatus, this detection system comprising a primary detection antenna, a flux transformer having a primary winding connected to the primary detection antenna, a SQUID device, a cryogenic device provided for cooling the SQUID device and the flux transformer, a step of processing the secondary detection signal emitted by the SQUID device, this processing step comprising a flux-locked loop and being provided to deliver an analog acquisition signal.

Document US2013271142A1 discloses low-field SQUID MRI components and methods. They include a low-field portable MRI instrument (SQUID) and a SQUID-based portable MRI system to be used under a bed. This MRI instrument implements a second-order superconducting gradiometer suitable for use with a SQUID low-field MRI device.

The object of the present disclosure is to propose a low-noise RF-based detection and acquisition system that is of simpler and less expensive design than the aforementioned systems of the prior art, and which improves the performance, in particular, in terms of signal-to-noise ratio.

BRIEF SUMMARY

This objective is achieved with a system for radiofrequency (RF) detection and acquisition based on SQUID, provided, in particular, to be integrated into a nuclear magnetic resonance apparatus (MRI or NMR), comprising:
- a volume-type primary detection antenna,
- a flux transformer having a primary winding connected to the primary detection antenna,
- a SQUID device, arranged to capture the magnetic flux captured by the primary antenna and reproduced by an input winding within the SQUID device via the flux transformer, and to deliver a secondary detection signal,
- a cryogenic device designed to cool the SQUID device,
- a step of processing the secondary detection signal emitted by the SQUID device, to deliver an analog acquisition signal, comprising a flux-locked loop (FLL) provided to linearize the response of the SQUID device.

According to the present disclosure, the SQUID device is of the low critical temperature type, the cryogenic device is further provided to cool the flux transformer, and the primary detection antenna is of the volume type and has an open geometry.

The primary detection antenna can thus comprise Helmholtz coils, saddle coils, or have a gradiometric geometry of order 1, of order 2, or of higher order. These volume antennas may be tuned to the signal to be detected, or non-tuned.

Working with a low magnetic field, around 1 mT or less, also makes it possible to benefit from a drastic increase in contrasts T1, opening the path to unique imaging possibilities in low-field mode. This fact is detailed in the publication "SQUID-detected MRI at 132 µT with $T_1$-weighted contrast established at 10 µT-300 mT" by S. K. Lee et al, published in the Journal "Magnetic Resonance in Medicine" Volume 53-1, January 2005, pages 9-14.

The flux-locked loop (FLL) can advantageously comprise a low-noise amplifier (LNA), which may include a semiconductor heterostructure amplifier or a SQUID-based amplification system. The SQUID-based amplification system is presented in document US2013271142A1. For the implementation of these technologies in the context of the present disclosure, reference may usefully be made to the work "The SQUID Handbook: Fundamentals of Technology and Applications of SQUIDs and SQUID systems" by John Clarke, Wiley-VCH 2004 editions.

The detection and acquisition system according to the present disclosure may further comprise one or more active noise compensation coils for noise external to this system.

The detection and acquisition system according to the present disclosure may further comprise one or more passive shielding screens of the system. This passive shielding may be magnetic in nature, in particular, via ferrites, mu-metal, CRYOPERM®, METGLAS®, or any other material or alloys of high magnetic permeability. This shielding may also be made of metal, for example, copper or aluminum.

In a preferred version of the present disclosure, the primary detection antenna cooperates with the flux transformer to concentrate the flux captured by the SQUID device.

Provision may also be made for the detection and acquisition system according to the present disclosure to further comprise within the flux transformer an inductance feedback coil arranged to react to the variations of the incoming flux, so as to keep the SQUID device at its maximum flux sensitivity level.

According to another aspect of the present disclosure, an item of magnetic resonance imaging (MRI) equipment is proposed comprising a SQUID-based radiofrequency detection and detection system (B) according to the present disclosure, an antenna holder device (A), integrating the volume-type primary detection antenna and connected to the detection and acquisition system (B), and an analog-to-digital conversion stage (C), provided to convert the analog acquisition signal into digital data suitable for post-processing for the purpose of generating and displaying an MRI image.

This MRI equipment can, for example, be coupled to a magnetoencephalography device (MEG).

The SQUID-based RF detection and acquisition system can be implemented in nuclear magnetic resonance (NMR) equipment, or in a SQUID-based magnetic sensor equipment for the prospecting of metals, with a view to detecting a radio frequency (RF) wave emitted by a metal vein in response to an emission of a radio frequency (RF) wave in a ground.

Ultra-sensitive radiofrequency sensor equipment can also be provided including a detection and acquisition system according to the present disclosure, or a radio-astronomy equipment item operating in the radiofrequency (RF) domain including a SQUID-based RF acquisition and acquisition system according to the present disclosure.

BRIEF DESCRIPTION OF THE DRAWINGS

The present disclosure can be better understood with reference to the figures described below.

DETAILED DESCRIPTION

One embodiment of a SQUID-based RF acquisition and acquisition system 1 according to the present disclosure will now be described with reference to FIG. 1.

This SQUID-based RF detection and acquisition system 1 comprises a primary inductive antenna 5 of the volume type, produced in the form of Helmholtz coils or in saddle coils, or of any other type of volume, in particular, gradiometric, which is connected, in the case where the antenna is resonant, via a coupling capacitor 9 with capacitance $C_a$ to a primary winding 6, with inductance $L_1$, of a flux transformer 2 having a secondary winding 7, with inductance $L_2$, in series with an input coil 8 with inductance Li generating a flux captured by a SQUID device 3.

If the antenna is not resonant, the capacitor is not present and the antenna 5 is directly connected to the primary winding 6.

The flux transformer 2 and the SQUID device 3 are kept at low temperature in a cryogenic device (not shown) comprising a pulse tube such as the product PT403 sold by CRYOMECH®.

A step 4 of processing the secondary detection signal comprises a pre-amplifier 40 (LNA) of the voltage measured at the terminals of the SQUID device 3. This voltage measurement represents a detection signal, which is applied at the input of a flux-locked loop circuit 41 including a low-noise amplifier and connected to a feedback coil 10 with inductance $L_{feed}$ intended to react to the incoming flux variations in order to keep the SQUID device 3 at its maximum flux sensitivity level. The method of the flux-locked loop is disclosed in the document US20120206136A1.

An example of quantitative features of the SQUID-based RF acquisition and acquisition system 1 is given below:
Typical time width of the wave train to be detected: $T_2^* \sim 50$ ms
Central frequency of the primary antenna $\omega_0 \sim 40$ kHz
Primary bandwidth $\Delta\omega \sim 20$ kHz
Primary quality factor $Q \sim 2$ (if resonant antenna)
Magnetic field strength at the primary antenna $B_p$, on the order of about one hundred fT to pT
Inductance of the input coil of the SQUID $L_i = 720$ nH
Specific inductance of the primary antenna $L_a \cong 0.1$ mH
Resistance of the primary antenna $R_a = 1\Omega$
Resonant capacity of the primary antenna $C_a = 6$ μF Inductive Antenna In view of the targeted applications, a volume-type geometry is chosen for the antenna 5. Examples of this geometry include Helmholtz coils, "saddle" coils, or other more complex geometries, in particular, gradiometric geometries. This geometry makes it possible to collect the highest possible signal while allowing, by its open geometry, relative comfort for the patient. The Faraday primary detection antenna 5 must be tuned to the MRI signal. This antenna 5 has for self-inductance La, the resistance $R_a$, which an attempt will be made to reduce as much as possible, in order to minimize the Johnson-Nyquist noise in the antenna.

The parameters $L_a$, $R_a$ are fixed by the selected antenna geometry and the type of material constituting the antenna. It is then possible to make the antenna resonant, which allows two things:
The quality factor Q of the resonant antenna makes it possible to naturally amplify the detected signal,
The bandwidth $\Delta\omega$ of the antenna makes it possible to filter the captured signals and to reject the electromagnetic noise out of the band of interest $\Delta\omega$.

This implementation works both for a resonant antenna and for a non-resonant antenna. The case of the resonant antenna is explained below.

The capacitance is set so that the natural frequency of the antenna $\omega_a = 1/\sqrt{L_a C_a}$ is tuned to the frequency $\omega_0 \approx 40$ kHz of the received signal. Furthermore, the design of the antenna must take into account its bandwidth $\Delta\omega_a = R_a/L_a$ that it is desired to have the same order of magnitude as the bandwidth width $\Delta\omega$ of the RF signal, so as not to lose information while limiting the detected noise. It is therefore the value of the self-inductance $L_a$ of the antenna 5, which will dictate the resistance and the ability to choose, based on the desired frequency characteristics.

The primary inductive antenna 5 is a volume antenna. For example, a Helmholtz geometry antenna, in a saddle shape, may be chosen or any other more complex volume geometry, in particular, gradiometric geometry.

Figure 3:
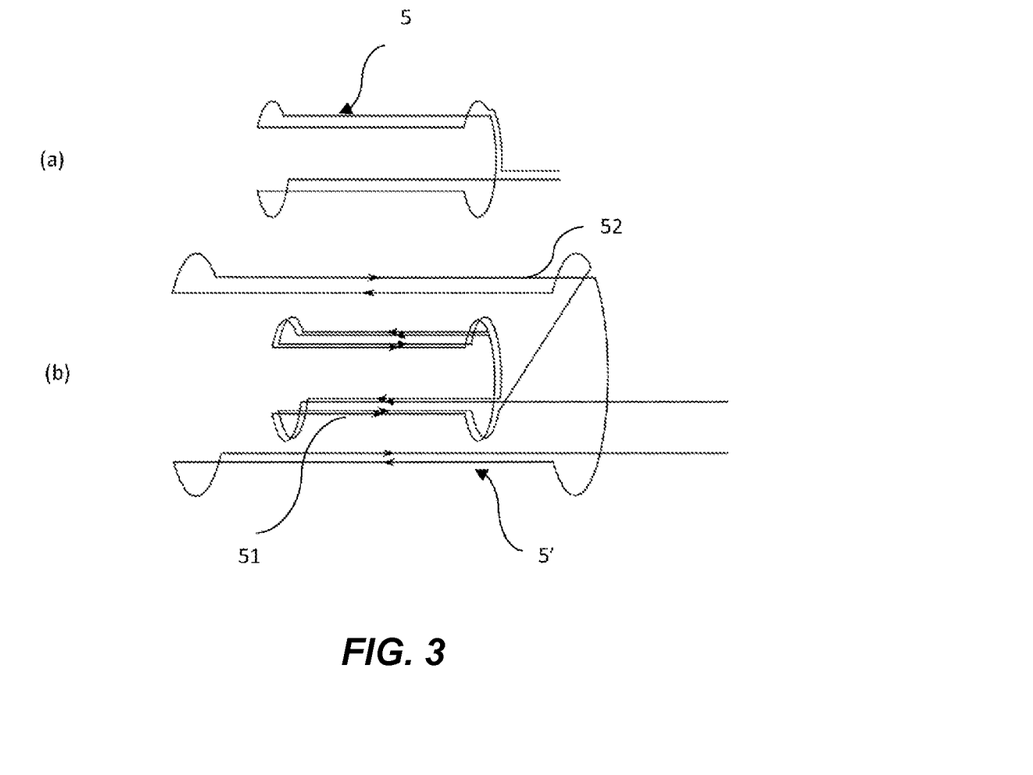
FIG. 3 illustrates several primary detection antenna geometries.

FIG. 3 shows two of these geometries for a volume antenna implemented in an RF detection and acquisition system according to the present disclosure.

The first geometry (a) is of the saddle type, well known to the person skilled in the art for its performance, particularly in terms of spatial homogeneity. The diameter of the saddle antenna is equal to 1.5 times its length.

The other geometry (b) is the first-order gradiometric version of the saddle. This volume antenna 5' consists of two sub-antennae 51, 52 mounted serially to one another. The first internal antenna 51 has a saddle geometry and in this example has two wire turns. The second sub-antenna 52, external and larger, also of saddle geometry, has a single wire turn. The dimensions of the system and the orientation of the wires are chosen such that:
The external part and the internal part of the antenna have the same inductance. This is allowed by the two wire turns in the internal antenna.
The current in the internal part circulates in the opposite direction from the current in the external part.

With this configuration, the gradiometric antenna-saddle 5' makes it possible to reject the noise coming from sources located a great distance in front of the dimensions of the volume antenna 5', while benefiting from the homogeneity properties of the saddle geometry. A detailed description of the principle of the gradiometric antennas is found in the article by R. L. Fagaly, "Superconducting quantum interference device instruments and applications," Review of scientific instruments 77, 101101 (2006).

Flow Concentration and Optimum Inductance

Figure 1:
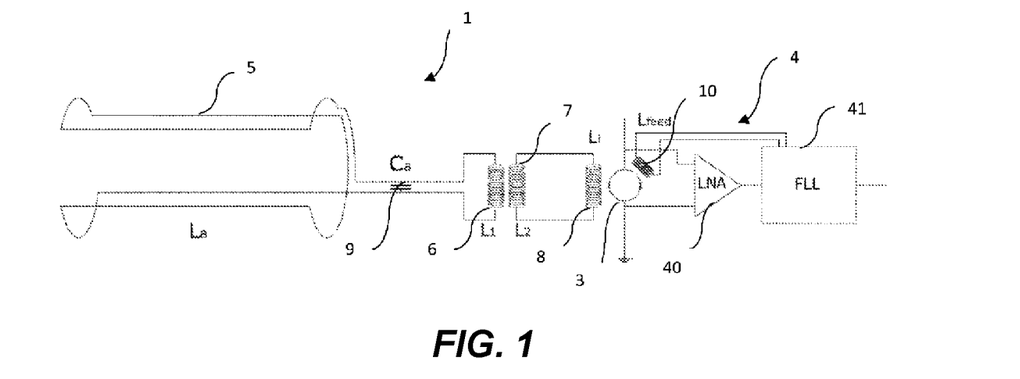
FIG. 1 is a diagram of the RF detection and SQUID-based signal processing circuit.

To determine the inductance of the antenna, the rest of the detection system is studied with reference to FIG. 1. The SQUID device 3 used (for example, model SQ680 from STARCRYO®) is coupled to an input coil 8 with inductance $L_i = 720$ nH, which performs the coupling in current with the primary detection antenna 5, via a flux transformer 2 embodied by the coils $L_1$ and $L_2$, which are inductively coupled. The current flowing in the antenna 5 (resp. the coil $L_2$) is denoted $i_1$ (resp. $i_2$) and the flux captured by the antenna 5 is denoted $\Phi_a$. Additionally, the mutual inductance of input coil-SQUID is denoted $M_{is} = k\sqrt{L_i L_s}$, and $M_{12} = k^{49}\sqrt{L_1 L_2}$ is the mutual between the coil $sL_1$ and $L_2$.

k and k' are dimensionless factors and $L_s$ is the self-inductance of the SQUID device 3. The aim is a relationship between the external flux captured by the antenna, $\Phi_a$, and $\Phi_{sq}$ the flux captured by the SQUID 3.

The inductive coupling relationships in the circuit are written $$\Phi_c + M_i i_i = (L_a + L_1) i_1 \tag{1}$$

$$(L_2 + L_i) i_i = M_i i_1 \text{ (the effect of the current flowing through the SQUID is ignored)} \tag{2}$$

$$\Phi_a = M_i i. \tag{3}$$

By combining these equations, the following is obtained $$\Phi_n = \frac{(L_s + L_1)(L_2 + L_i) - M_{12}^2}{M_{is} M_{12}} \Phi_s \tag{4}$$

This latter equation establishes a link between the external excitation, given by $\Phi_a$, and the response level of the SQUID 3, quantified by $\Phi_{sq}$. It is then understood why such an assembly is called a "flux concentrator": the main role of the Faraday primary detection antenna 5 is to increase the flux captured by the SQUID 3.

The maximum sensitivity level of the device, giving the greatest response in $\Phi_s$ for a given $\Phi_a$, is reached for $$L_1 = \frac{L_a}{\sqrt{1-k^{-2}}} \quad (5)$$

$$L_2 = \frac{L_i}{\sqrt{1-k^{-2}}} \quad (6)$$

The resistance of the primary detection antenna 5 is set to a reasonable value, for example, $R_a=1\Omega$. In order to comply with the value of the bandwidth on the order of about ten kH, it is therefore necessary to ensure $L_a=0.1$ mH. This value of $L_a$ sets a value for the capacitor:

$$C_a = \frac{1}{L_a \omega_0^2} = 6,3 \ \mu F \quad (7)$$

The ratio of the inductances $L_1$ and $L_2$ is therefore required:

$$\frac{L_1}{L_2} = \frac{L_a}{L_i} \quad (8)$$

that is $L_1$ 1390$L_2$. The precise values of $L_1$ and $L_2$ are set by the coupling constant $k^{49}$ that should be as close as possible to 1 in order to ensure the maximum sensitivity of the device.

Flux Transformation Requirement

It is reasonable to wonder why the inductive coupling has been introduced via the coils $L_1$ and $L_2$. It would have been simpler to connect the antenna directly with the input coil of the SQUID 3. It is assumed that the flux transformer 2 comprising the coils ($L_1$) and ($L_2$) is absent, and that the inductive antenna with inductance $L_a$ is in series with the input coil ($L_i$) of the SQUID. Magnetic coupling is then written $$\Phi_a = (L_a + L_i)i_1 \quad (9)$$

hence introducing the coupling to the SQUID $\Phi_{sq} = M_{is}i_1$ $$\Phi_a = \frac{L_a + L_i}{k\sqrt{L_i L_s}} \Phi_s \quad (10)$$

The preceding equation shows that the maximum sensitivity is reached for an inductance of the antenna 5 by equalizing the inductance of the antenna 5 to that of the input coil 8 of the SQUID 3: $L_a = L_i$.

For example, it is possible to adjust the inductance of the antenna 5 by adjusting the number of turns in the loop, or by adjusting its geometry.

The need to introduce a flux transformer is then understood. Indeed, without the latter, the inductance of the antenna is imposed on the value $L_a = L_i = 720$ nH. This inductance value imposes a resistance for the antenna $$R_a = L\Delta\omega = 0.72 \ m\Omega \quad (11)$$

and a capacitor to connect to the antenna with the value $$C_a = \frac{1}{L\omega_0^2} = 0.87 \ mF \quad (12)$$

These results are not satisfactory for two reasons: On the one hand, the capacity found is extremely high; for these values chemical capacitors should be used, which could not be adapted to the cold of the cryostat. On the other hand, the value of the resistance is very low, which will have an impact on the intensity noise in the antenna $$\delta i_a = \sqrt{\frac{4k_B T}{R}} \quad (13)$$

that is, with an antenna cooled to 100 K, $\delta i_a \approx 3$ nA/$\sqrt{Hz}$. This noise is much too high with regard to the very low level of noise at the input of the SQUID on the order of pA/$\sqrt{Hz}$.

One solution is to increase the resistance of the primary detection antenna 5, which requires passing through a flux transformer 2 to adapt the inductor in order to preserve the same bandwidth.

SQUID Current Reader

The SQUID device 3 used is a low-Tc SQUID (for example, SQ680 from STARCRYO®) cooled by a cryocooler, for example, PT 403 from CRYOMECH®, and biased by a current $i_p$.

Unlike its high-Tc counterparts, the low-Tc SQUID has a much lower thermal noise level, which makes it possible to drastically increase the signal-to-noise ratio and ultimately the quality of the final image. Its role is to read the current generated in the input coil, with a noise level of 0.8 pA/$\sqrt{Hz}$. This noise level is therefore the objective to be achieved for the thermal noise in the inductive antenna.

Low-Noise Amplifier-FLL

The SQUID device has a non-linear, periodic current-captured flux response with a quantum flux period $\Phi_0 = h/2e$. To linearize this response in order to avoid artifacts degrading the image quality, the SQUID 3 is coupled to a flux-locked loop (FLL), an example of which is described below.

This loop first has a pre-amplifier 40 (LNA) of the voltage measured at the terminals of the SQUID.

Two choices can be envisaged for the amplification system: Either opting for amplification with SQUID, as is, for example, the case in document US2013271142A, or using a semiconductor heterostructure amplification of the ASIC type, which is potentially more advantageous but also poses more constraints, in particular, in the maximum voltage oscillation level of the incoming signal.

The feedback coil 10 with inductance $L_{feed}$ makes it possible to react to the incoming flux variations in order to keep the SQUID 3 at its maximum flux sensitivity level. The signal is read at the output of the flux-locked loop.

MRI Equipment

An ultra-sensitive detection and RF acquisition system based on SQUID can be integrated into MRI equipment using a working magnetic field of the order of B0=1 mT (which corresponds to a frequency $\omega 0$ 40 kHz), while retaining an acquisition time and an image quality in accordance with current clinical standards. The decrease in the working magnetic field by several orders of magnitude makes it possible to eliminate the constraints, preventing on the one hand a massive adoption of the MRI as an imaging standard and on the other hand the opening of still-non-existent applications such as MRI on board a truck in order to diagnose the type of stroke (ischemic or hemorrhagic), 100% MRI screening for breast cancer (carried out by CT scan), or intraoperative MRI, thanks to light equipment, without magnetic shielding, which is not very expensive.

Figure 2:
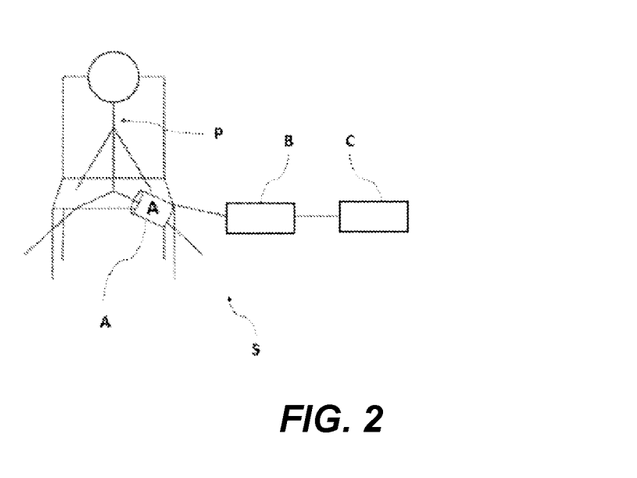
FIG. 2 is a schematic diagram of an MRI acquisition from an embodiment of the RF detection system of the present disclosure.

FIG. 2 shows a schematic diagram of an MRI experiment carried out with the detection system according to the present disclosure. A knee MRI was chosen, the osteoarticular imaging being one of the first likely applications of the present disclosure. The knee of the patient is inserted into a cylinder, which comprises a solenoid ensuring a permanent field $B_0 \approx 1$ mT homogenous at about 10 ppm over a volume of about $10 \times 10 \times 10$ cm$^3$, of gradients, and the reception antenna described above. The receiving antenna is cooled to a temperature of about 60 K using a custom cryogenic system derived from the pulse tube, ensuring the cooling of the SQUID system of part B.

Part B comprises the SQUID ensuring the reading of the current coming from the inductive antenna, as well as the processing electronics of the signal described above, the pre-amplification system, and the flux-locked loop FLL composed of an integrator amplifier, a read resistor, and a looping coil $L_{feed}$. This whole stage is cooled using a cryogenic machine, for example, the PT403 pulse tube from CryoMech, at a temperature near 4.2 K.

Part C provides the analog-digital conversion of the signal for computer post-processing in order to control the equipment and to display the obtained MRI image.

Medical Applications

The sensitivity and portability of the device make it interesting in the first place for magnetic resonance imaging (MRI). The high contrast levels obtained at a low field make the technology interesting for diagnostics where contrast is currently insufficient with high-field technologies.

Furthermore, equipment according to the present disclosure could easily be installed in an ambulance truck in order to rapidly diagnose, on the site of the accident, an ischemic or hemorrhagic stroke, in order to care for the patient more quickly and to avoid irreversible damage to cognitive faculties.

Due to its low cost and its ease of use, the imaging equipment according to the present disclosure could also spread widely in use cases where it is not being used enough today: Screening for breast cancer in women over the age of 50, use in neurology and psychiatry: early screening for diseases such as schizophrenia, depression, or epilepsy; screening for prostate cancer.

Finally, numerous SQUID-based low-field MRI projects also have the purpose of designing a hybrid MRI-magnetoencephalography (MEG) apparatus. This is the case for the work of the team of the University of Aalto in Finland, with reference to the source https://www.aalto.fi/en/department-of-neuroscience-and-biomedical-engineering/meg-mri-brain-imaging-group.

A SQUID-based MRI equipment item according to the present disclosure may be adapted to integrate a MEG device therein.

Nuclear Magnetic Resonance

The NMR apparatuses used, in particular, for chemical characterization can also benefit from the detection system in order to design lighter and less expensive equipment, for reasons similar to the ones given for MRIs.

Mining Industry

In the mining industry, there are already SQUID-based magnetic sensors for the prospecting of metals, as illustrated by document U.S. Pat. No. 7,394,250. The detection system can also be integrated in such an apparatus for mining, thanks to its very low noise level. The principle is as follows: an RF wave is emitted in the ground, if a metal vein is present, eddy currents are induced in the vein, which in turn emits an RF wave, this wave is detected by the apparatus integrating the detection system with SQUID.

Military Field

Ultra-sensitive radiofrequency sensors are well-known elements of electronic warfare systems: they serve, for example, to detect communication signals. Another advantageous application is the detection of underwater submersibles: as a submersible consists of ferromagnetic materials, the device is capable of detecting its presence by emitting RF waves and detecting the waves produced by induced eddy currents, on the same principle as mining. Other systems, meanwhile, detect the disturbance of the local terrestrial field generated by the passage of the underwater vehicle, as illustrated by the document "Magnetic detection of a surface ship by an airborne LTS SQUID MAD" by Megumi Hirota et al., April 2001, IEEE Transactions on Applied Superconductivity 11(1):884-887.

Radioastronomy

SQUID-based systems are already widely used in the field of radioastronomy, for example, integrated into superconducting bolometers for reading and/or amplifying very low currents. Due to its very high sensitivity, the system may find an interesting integration in a calibrated telescope in the RF domain.

Of course, the present disclosure is not limited to the embodiments that have just been described and numerous other alternative embodiments can be envisaged within the scope of the present disclosure.

The invention claimed is:

1. A system for radio frequency detection and acquisition based on SQUID, for integration into a nuclear magnetic resonance apparatus, comprising:
    a volume-type primary detection antenna;
    a flux transformer having a primary winding connected to the volume-type primary detection antenna;
    a SQUID device, arranged to capture magnetic flux captured by the volume-type primary detection antenna and reproduced by an input winding within the SQUID device via the flux transformer, and to deliver a secondary detection signal;
    a cryogenic device designed to cool the SQUID device at a low critical temperature; and
    a unit configured to process the secondary detection signal emitted by the SQUID device to deliver an analog acquisition signal, comprising a flux-locked loop for linearizing a response of the SQUID device;
    wherein, the cryogenic device is configured to cool the flux transformer, the volume-type primary detection antenna has an open geometry and is at a temperature higher than the low critical temperature, and the flux transformer has a secondary winding connected to the input winding.

2. The system of claim 1, wherein the volume-type primary detection antenna comprises Helmholtz coils.

3. The system of claim 1, wherein the volume-type primary detection antenna comprises saddle coils.

4. The system of claim 1, wherein the volume-type primary detection antenna has a gradiometric geometry.

5. The system of claim 1, wherein the flux-locked loop comprises a low-noise amplifier.

6. The system of claim 5, wherein the low-noise amplifier comprises a semiconductor heterostructure amplifier.

7. The system according to claim 5, wherein the low-noise amplifier comprises a SQUID-based amplification system.

8. The system of claim 1, further comprising one or more active noise compensation coils for noise external to the system.

9. The system of claim 1, wherein the volume-type primary detection antenna cooperates with the flux transformer to concentrate the flux captured by the SQUID device.

10. The system of claim 1, further comprising, within the flux transformer, an inductance feedback coil arranged to react to variations of the incoming flux, so as to keep the SQUID device at a maximum flux sensitivity level.

11. A magnetic resonance imaging (MRI) equipment comprising:
- the system for radio frequency detection and acquisition based on SQUID according to claim 1;
- an antenna holder device, integrating the primary detection antenna of volume type and connected to the detection and acquisition system; and
- an analog-to-digital conversion stage, configured to convert the analog acquisition signal into digital data suitable for post-processing to generate and display an MRI image.

12. The MRI equipment of claim 11, wherein the MRI equipment item is coupled to a magnetoencephalography device.

13. A nuclear magnetic resonance equipment including the system for radio frequency detection and acquisition based on SQUID according to claim 1.

14. A SQUID-based magnetic sensor equipment for prospecting metals, including the system for radio frequency detection and acquisition based on SQUID according to claim 1, configured to detect a radio frequency wave emitted by a metal vein in response to an emission of a radio frequency wave in a ground.

15. An ultra-sensitive radiofrequency sensor equipment including the system for radio frequency detection and acquisition based on SQUID according to claim 1.

16. A radioastronomy equipment operating in the radio frequency domain and including the system for radio frequency detection and acquisition based on SQUID according to claim 1.

* * * * *

UNITED STATES PATENT AND TRADEMARK OFFICE
CERTIFICATE OF CORRECTION

PATENT NO. : 12,461,175 B2
APPLICATION NO. : 18/255967
DATED : November 4, 2025
INVENTOR(S) : Dimitri Labat Page 1 of 1

It is certified that error appears in the above-identified patent and that said Letters Patent is hereby corrected as shown below:

In the Specification

| | | |
|---|---|---|
| Column 6, | Line 41, | change "$M_{12}=k^{49}$" to --$M_{12}=k'$-- |
| Column 6, | Line 49, | change "$\Phi_c+M_i i_=(L_a+L_1)i$," to --$\Phi_a+M_{12}i_2=(L_a+L_1)i_1$-- |
| Column 6, | Line 51, | change "$(L_2+L_1)i_=M_i i_,$" to --$(L_2+L_1)i_2=M_{is}i_1$-- |
| Column 6, | Line 54, | change "$\Phi_a=M_i i_.$" to --$\Phi_a=M_{12}i_1$-- |
| Column 6, | Line 59, | change "$\Phi_n = \frac{(L_s+L_1)(L_2+L_i)-M_{12}^2}{M_{is}M_{12}} \Phi_s$" to --$\Phi_a = \frac{(L_a+L_1)(L_2+L_i)-M_{12}^2}{M_{is}M_{12}} \Phi_s$-- |
| Column 7, | Line 5, | change "$\sqrt{1-k^2}$" to --$\sqrt{1-k'}$-- |
| Column 7, | Line 8, | change "$\sqrt{1-k^2}$" to --$\sqrt{1-k'}$-- |
| Column 7, | Line 29, | change "constant $k^{49}$ that" to --constant $k'$ that-- |
| Column 7, | Line 46, | change "$k\sqrt{L_iL_s}$" to --$k\sqrt{L_iL_s}$-- |

Signed and Sealed this
Sixteenth Day of December, 2025

John A. Squires
*Director of the United States Patent and Trademark Office*